United States Patent
Yeh

(10) Patent No.: US 6,641,071 B1
(45) Date of Patent: Nov. 4, 2003

(54) FISHING REEL WITH A UNIDIRECTIONAL CONTROL DEVICE

(76) Inventor: Shih-Yuan Yeh, No. 260, Chen-Fu Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 10/174,027

(22) Filed: Jun. 18, 2002

(51) Int. Cl.⁷ .............................................. A01K 89/00
(52) U.S. Cl. ................... 242/317; 242/295; 242/301; 192/45
(58) Field of Search .................. 242/317, 318, 242/295, 301, 246; 192/45

(56) References Cited

U.S. PATENT DOCUMENTS

| | | | | |
|---|---|---|---|---|
| 2,800,987 A | * | 7/1957 | Potts | 192/45 |
| 4,354,585 A | * | 10/1982 | Ritter | 192/45 |
| 4,750,687 A | * | 6/1988 | Sievert et al. | 242/295 |
| 5,609,309 A | * | 3/1997 | Oh | 242/282 |
| 5,918,826 A | * | 7/1999 | Arkowski | 242/295 |
| 5,921,492 A | * | 7/1999 | Bauer | 242/317 |
| 6,286,772 B1 | * | 9/2001 | Koelewyn | 242/246 |
| 6,382,545 B1 | * | 5/2002 | Yeh | 242/317 |

* cited by examiner

*Primary Examiner*—Emmanuel M Marcelo
(74) *Attorney, Agent, or Firm*—Thorp Reed & Armstrong, LLP

(57) ABSTRACT

A fishing reel has a spool base, a spool, a unidirectional control device and an axle penetrating the elements of the fishing reel. The unidirectional control, device has a limiting wheel with a driving roller recess to receive a driving roller. A plurality of first guide trenches is defined in the limiting wheel and inclinedly extends from the driving roller recess in a first direction. A plurality of second guide trenches is defined in the limiting wheel and inclinedly extends from the driving roller recess in a second direction opposite to the first direction. A biasing member is deformably received in each respective first guide trench. A brake block is movably received in each respective first guide trench. Accordingly, the rotating direction of the fishing reel is changeable by means of changing the locations of the brake blocks and the biasing members.

6 Claims, 6 Drawing Sheets

FISHING REEL WITH A UNIDIRECTIONAL CONTROL DEVICE

BACKGROUND OF THE INVENTION

1. Field of the Invention

The present invention relates to a fishing reel, and more particularly to fishing reel with a unidirectional control device that can be used equally well by a right-handed person or a left-handed person.

2. Description of Related Art

Fishing is a popular way to release working pressure and enjoy natural beauty for people all over the world. Most people fish for fun and enjoy the achievement of catching fish. Therefore, all types of fishers need to have a fishing rod and other fishing accessories handy because the unexpected opportunity to catch the big one may appear. In particular, fly fishing has been considered the ultimate form of grace in angling and unlike many other styles a center pin reel is still used. Despite many refinements, such a reel is much simpler than other reels such as multiplier and fixed spool reels, in that it is in essence a drum revolving on a spindle. In use, line is cast by flexing the rod back and forth, and the momentum of the released fly and line revolves the reel until the fly drops to the water. To retrieve the fly, the angler has to revolve the drum of the reel in the direction opposite to that when releasing the line. If a fish is hooked and puts a struggle further line may be pulled from the reel because the angler cannot immediately overpower the fish. In order to prevent too much line undesirably being pulled from the reel a ratchet system is fitted within the reel whereby varying levels of resistance to outward rotation of the drum is limited. Thus, the reel has a substantially unidirectional mode.

Because the direction of rolling the reel for a right-handed person is opposite to that for a left-handed person, two fishing reels with different unidirectional modes are needed for the use of different users. However, the unidirectional structure of the conventional fishing reel is complex and is not adjustable. The conventional fishing reel has a high manufacture cost and is not easy to maintain by the owner.

To overcome the shortcomings, the present invention tends to provide a fishing reel to mitigate or obviate the aforementioned problems.

SUMMARY OF THE INVENTION

The main objective of the invention is to provide a fishing reel with a unidirectional control device that can be used by either a right-handed person or a left-handed person. The fishing reel has a spool base, a spool, a unidirectional control device and an axle axially penetrating the elements of the fishing reel. The unidirectional control device has a rotating plate, a driving roller, a limiting wheel, a locking device and a trigger device. A driving roller recess is defined in the limiting wheel to receive the driving roller. A plurality of first guide trenches is defined in the limiting wheel and inclinedly extends from the driving roller recess in a first direction. A plurality of second guide trenches is defined in the limiting wheel and inclinedly extends from the driving roller recess in a second direction opposite to the first direction of the first guide trenches. A biasing member is deformably received in each respective first guide trench. A brake block is movably received in each respective first guide trench to be selectively engaged with a corresponding one of the biasing members. The second guide trenches are kept empty. Accordingly, the driving roller and the spool will be limited to roll in a direction by the brake blocks in the first guide trenches. In addition, the rotating direction of the fishing reel is changeable by means of changing the locations of the brake blocks and the biasing members to be used by either a right-handed person or a left-handed person. The use of the fishing reel is versatile, and the cost for manufacturing different types of the fishing reel is low.

Other objects, advantages and novel features of the invention will become more apparent from the following detailed description when taken in conjunction with the accompanying drawings.

DETAILED DESCRIPTION OF PREFERRED EMBODIMENT

Figure 1:
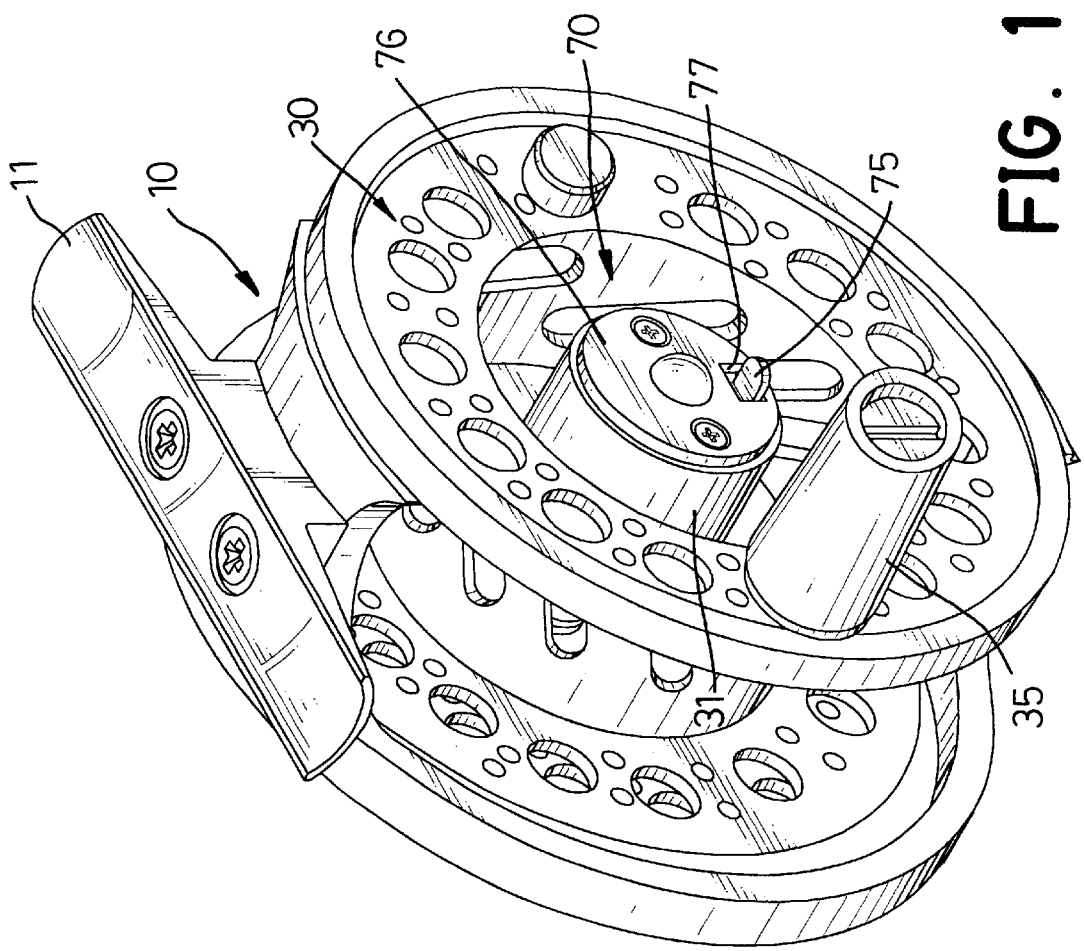
FIG. 1 is a perspective view of a fishing reel in accordance with the present invention.
Figure 2:
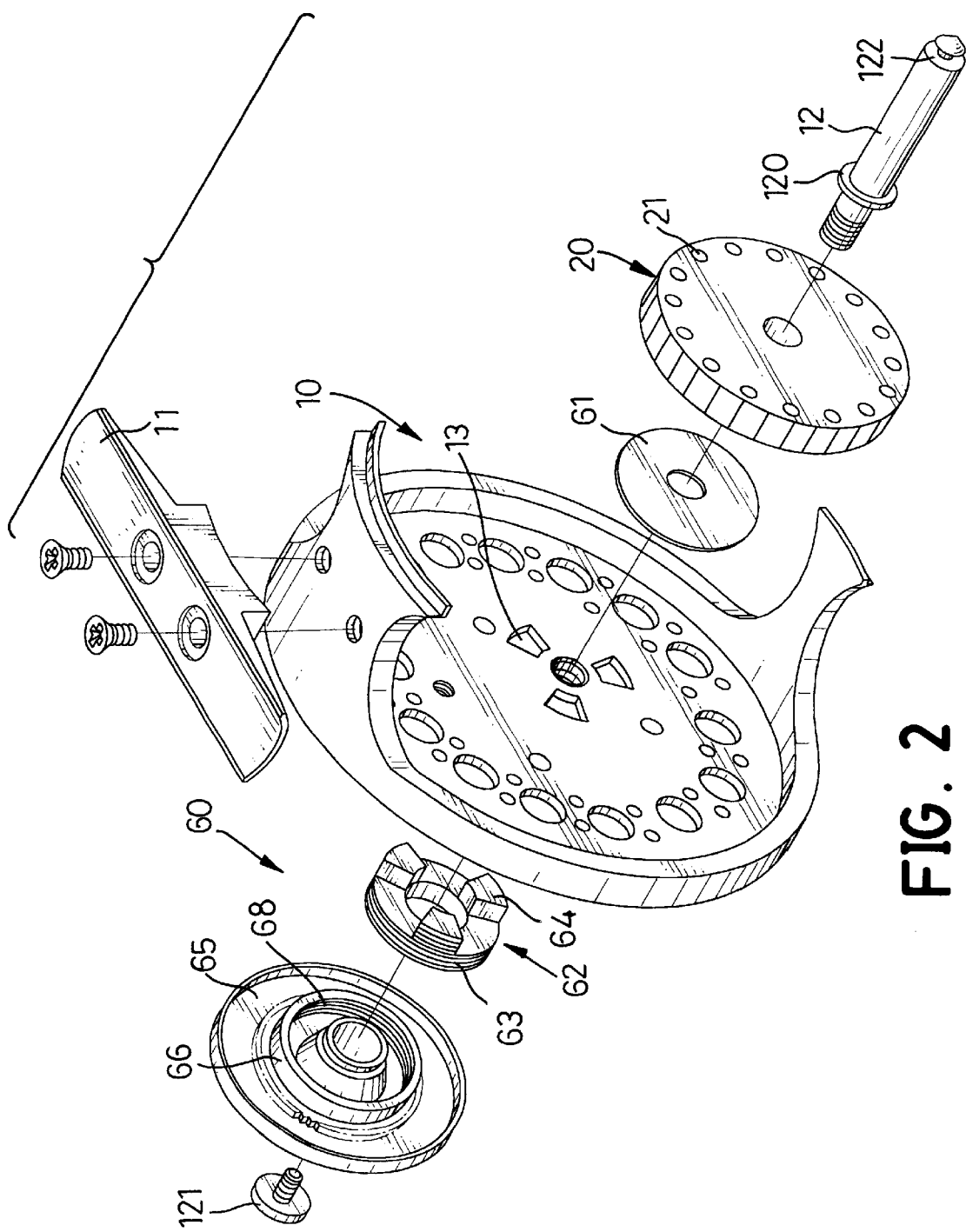
FIG. 2 is an exploded perspective view of a base part of the fishing reel in FIG. 1.
Figure 3:
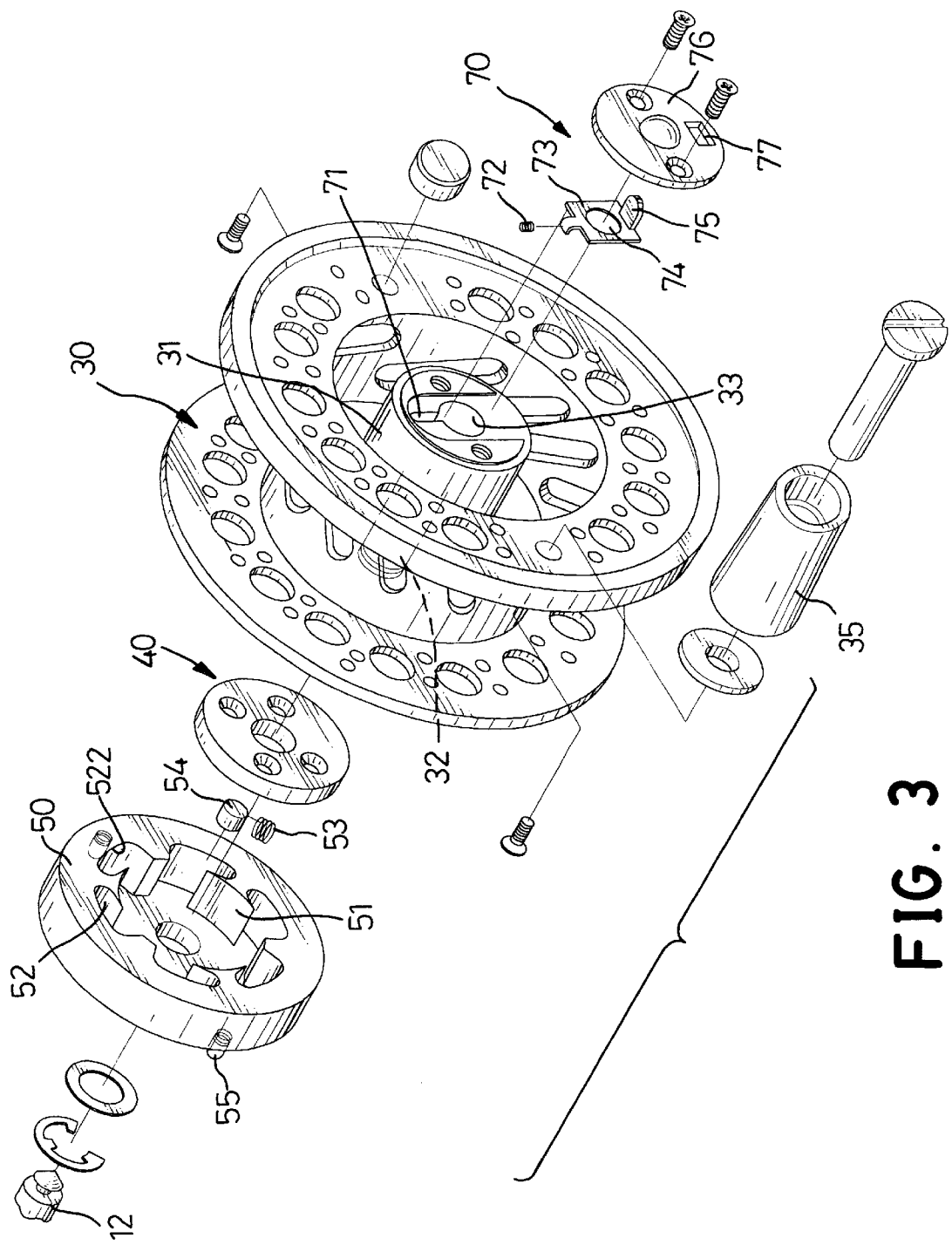
FIG. 3 is an exploded perspective view of a spool part of the fishing reel accompanying the base part in FIG. 1.

With reference to FIGS. 1 to 3, a fishing reel is composed of a spool base (10), a spool (30), a unidirectional control device and an axle (12) axially penetrating the elements of the fishing reel.

The spool base (10) is a round plate and has two opposed arms (not numbered) protruding outwardly and laterally from one face of the spool base (10). A fixing member (11) is firmly screwed on one arm (11) of the spool base (10) and is adapted to be detachably secured on a fishing rod (not shown). An axle aperture (not numbered) is defined in the center of the round plate of the spool base (10). Multiple limit holes (13) are defined in the round plate of the spool base (10) and around the axle aperture.

Figure 4:
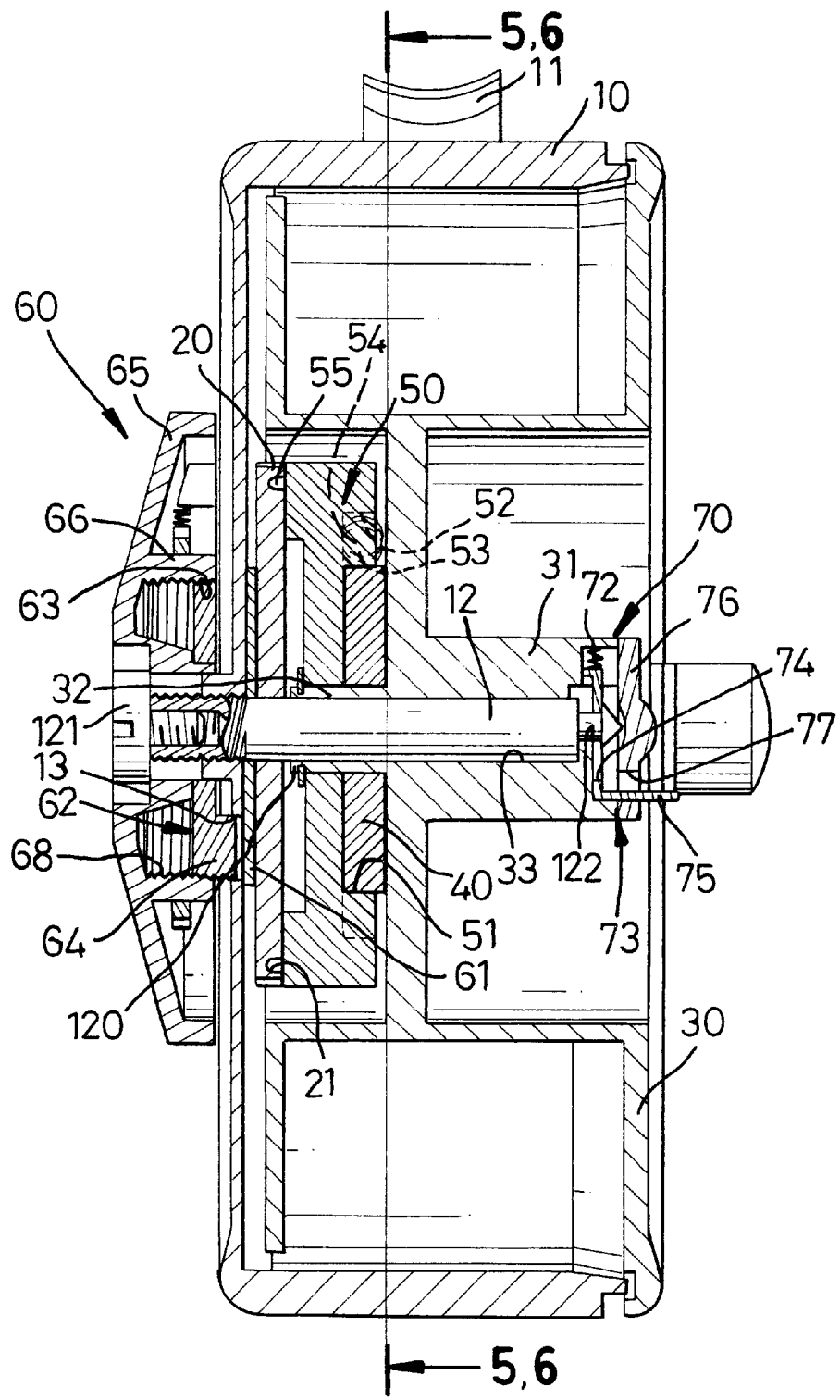
FIG. 4 is a side plan view in partial cross section of the fishing reel in FIG. 1 showing that a lock collar unlocks a cushion.

The spool (30) is secured on the axle (12) and is composed of a pole (31), two ring plates (not numbered) with one combining bridge (not numbered) formed between the ring plates, and a connecting plate extending between the pole (31) and the combining bridge. The ring plates and the combining bridge form a U-shaped passage as shown in FIGS. 3 and 4 to receive a fishing line. An axle channel (33) is axially defined in the center of the pole (31), and a groove (71) is defined outwardly from the axle channel (33). A handle (35) is firmly attached to one of the ring plates of the spool (30) to enable a user to rotate the spool (30).

The unidirectional control device comprises a rotating plate (20), a driving roller (40), a limiting wheel (50), a locking device (60) and a trigger device (70). The rotating plate (20) is rotatably sandwiched between the spool base (10) and the limiting wheel (50), and has a plurality of concavities (21) defined around one edge facing toward to the spool (30).

The driving roller (40) is sandwiched between the limiting wheel (50) and the spool (30) and is firmly secured on the axle (12).

The limiting wheel (50) is operationally mounted on the axle (12). A roller recess (51) is defined in the limiting wheel (50) at a side facing the spool (30) to receive the driving roller (40) inside. A plurality of first guide trenches (52) is defined in the limiting wheel (50) and inclinedly extend in a same direction from the driving roller recess (51). A plurality of second guide trenches (522) is defined in the limiting wheel (50). The second guide trenches (522) inclinedly extend from the driving roller recess (51) in a same direction that is opposite to the direction of the first guide trenches (52). The guide trenches (52) with the same direction respectively have a biasing member (53) and a brake block (54) received in a distal end of the guide trench (52), and the other guide trenches (522) with the opposite direction are kept empty. Each brake block (54) abuts the corresponding one of the biasing members (53). Each brake block (54) contacts with the guide trench (52) when the brake block (54) is confined in the guide trench (52). Each guide trench (52,522) is defined in a special shape that allows the brake block (54) to freely rotate and move close to the biasing member (53) but limits the brake block (54) to rotate and leave the biasing member (53) to limit the rotation of the spool (30) to one direction. In other words, each guide trench (52) has larger and smaller widths than a diameter of the brake block (54) in different portions to achieve the limitation of the brake block (54).

Accordingly, when the driving roller (40) is attempted to be rotated in a direction to roll the brake block (54) away from the biasing member (53), the brake block (54) tends to roll away from the biasing member (53) towards the diminishing dimension of the width of the guide trench (52). The brake block (54) is instantly caught in a middle portion of the guide trench (52).

Multiple hard springs (55) are immovably mounted on the second side of the limiting wheel (50) to rabbet in the concavities (21) of the rotating plate (20). The stiff springs (55) can be twisted when the unpredictably excessive rotation of the reel happens so as to avoid the breakage or damage to the rotating plate (20) and the limiting wheel (50) of the unidirectional fishing reel.

The locking device (60) includes a cushion (61), a lock collar (62), and a clutch knob (65). The cushion (61) is set between the spool base (10) and the rotating plate (20). The lock collar (62) has a threaded periphery (63) and multiple stubs (64) formed on a face adjacent to the spool base (10). The stubs (64) are in accordance with and rabbeted to the limit holes (13) of the spool base (10) in position and in quantity. The clutch knob (65) is rotatably engaged with the spool base (10) by a screw rod (121) and has a strut (not numbered) erected at the center thereof, and an inner flange (66) formed toward to spool base (10) and surrounding the strut. The inner flange (66) has a thread (68) defined in the inner surface thereof and mated with the threaded periphery (63) of the lock collar (62).

The trigger device (70) is composed of a resilient element (72), a trigger sheet (73), and a cap (76). The resilient element (72) is a spring and which is compressed by the trigger sheet (73). The trigger sheet (73) has through hole (74) defined in the center thereof and a tongue (75) extending outwardly on the trigger sheet (73). The cap (76) is firmly attached by two screws on the face of the pole (33) of the spool (30) and encloses the trigger sheet (73) between the pole (33) and the cap (76). The cap (76) has a tongue hole (77) defined therein to allow the tongue (75) to extend therethrough so that the trigger sheet (73) may be manipulated from outside of the spool (30).

The axle (12) has an annular groove (122) defined around one distal end of the axle (12) to engage with the inner edge of the through hole (74) of the trigger sheet (73) when the spring is pressed by the trigger sheet (73). Consequently, the axle (12) is locked when the trigger sheet (73) is moved to the original place by the resilient force of the resilient spring (72) so as to confirm the steady combination of the unidirectional fishing reel.

A stop flange (120) is formed in a middle section of the axle (12) to separate the rotating plate (20) and the limiting wheel (50). The stop flange (120) limits a fixed distance from the knob (65) to the stop flange (120) so that there is no relative movement between the clutch knob (65) and the spool base (10).

With reference to FIGS. 3 and 4, after the reel is assembled, a space is defined between the stubs (64) of the lock collar (62) and the cushion (61). Consequently, the stubs (64) do not compress the rotating plate (20). There is no locking limitation to the fishing reel and all elements penetrated by the axle (12) are freely rotated with the axle (12), except the spool base (10) which is firmly secured on the fishing rod. When the handle (35) drives the fishing reel, the spool (30) can be rotated in two directions to release or collect the fishing line thereon so that the fishing reel is in the status of free rotation.

When the clutch knob (65) is turned, the clutch knob (65) drives the lock collar (62) to move forward or backward because there is no relative movement between the knob (65) and the spool base (10). The limit holes (13) of the base (10) will restrict the rotation of the lock collar (62).

Figure 5:
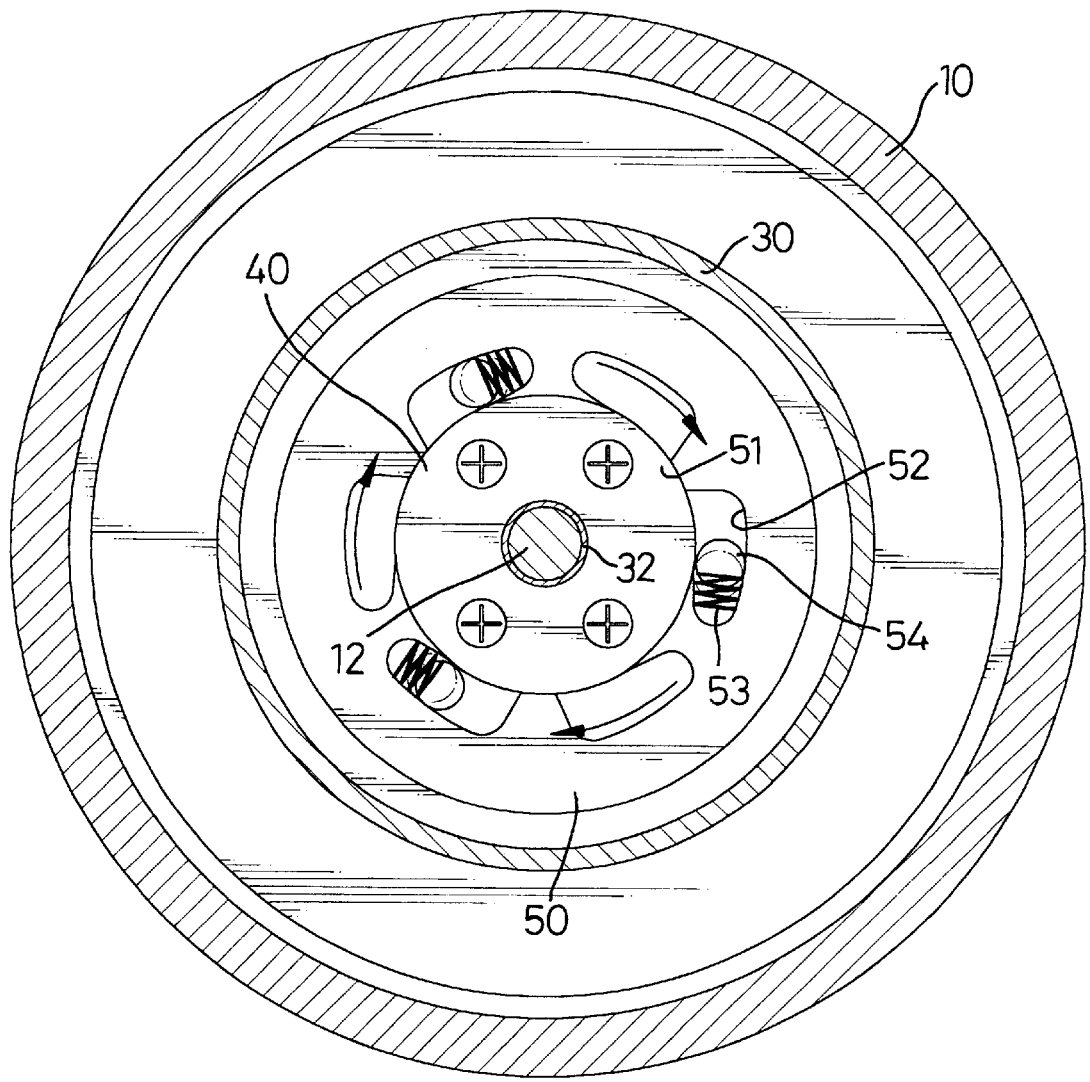
FIG. 5 is a front plan view in partial cross section of the fishing reel along a line 5—5 in FIG. 4 and showing a movement of the driving roller of the fishing reel in a unidirectional status for use by a right-handed person.

When the stubs (64) tightly compress the cushion (61), the rotating plate (20) is restricted from free rotation so as to lock the limiting wheel (50). With reference to FIG. 5, the driving roller (40) is driven clockwise to make the brake block (54) rotate and resiliently compress the biasing member (53). When the rotation of the driving roller (40) is stopped, the biasing member (53) resumes its original shape and so pushes the brake block (54) back to its original position. As mentioned before, the guide trench (52) limits the counterclockwise rotation of the driving roller by restricting movement of the brake block (54). Therefore, the driving roller (40) rotated with the axle (12) driven by the handle (35) is limited to roll unidirectionally.

Figure 6:
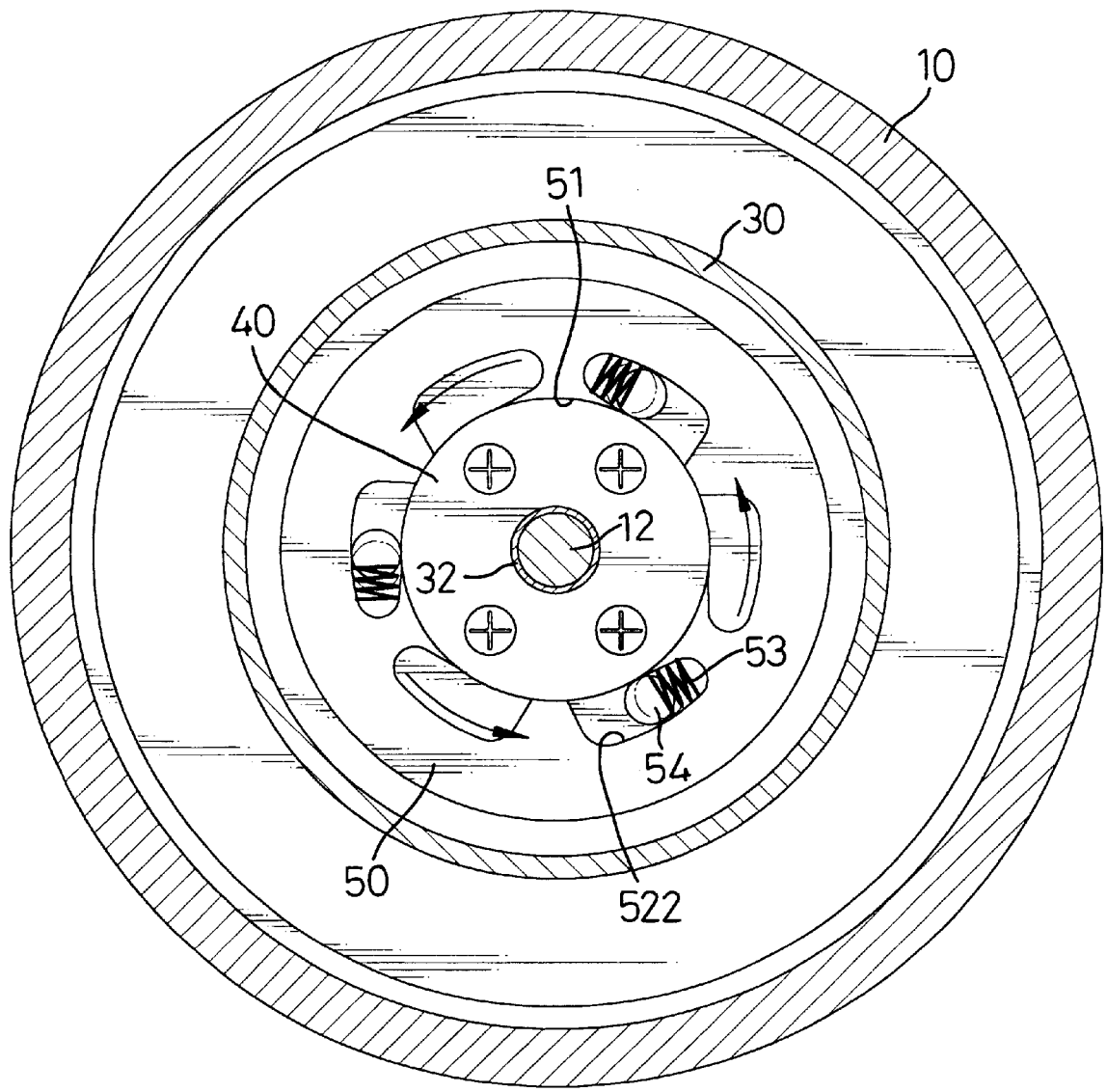
FIG. 6 is a front plan view in partial cross section of the fishing reel along a line 6—6 in FIG. 4 and showing a movement of the driving roller of the fishing reel in another unidirectional status for use by a left-handed person.

With reference to FIG. 6, when the brake blocks (54) and the biasing members (53) are mounted on the second guide trenches (522) with the opposite direction the driving roller (40) and the spool (30) will be limited to roll in another direction, i.e., counterclockwise as shown in FIG. 6.

Accordingly, the fishing reel with the unidirectional control device in accordance with the present invention can be used by a right-handed person or a left-handed person by means of changing the locations of the brake blocks (54) and the biasing members (53). Only one type of structure is needed to manufacture the fishing reel for the needs of different customers and thus the cost for manufacturing different types of fishing reel is low.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fishing reel comprising:
   a spool base adapted to be detachably secured on the fishing rod and having multiple limit holes defined in the spool base;
   a rotating plate rotatably engaged with the spool base and having a plurality of concavities defined around a peripheral edge of the rotating plate;
   a spool sandwiching the rotating plate with the spool base and having a handle firmly connected to one side of the spool;
   a limiting wheel rotatably engaged with the rotating plate and having:
      a driving roller recess defined in the limiting wheel at a first side facing the spool;
      a plurality of first guide trenches defined in the limiting wheel to communicate with the driving roller recess and inclinedly extending from the driving roller recess in a first direction;
      a plurality of second guide trenches defined in the limiting wheel to communicate with the driving roller recess and inclinedly extending from the driving roller recess in a second direction opposite to the first direction of the first guide trenches;
      a biasing member deformably received in each respective first guide trench;
      a brake block movably received in each respective first guide trench to be selectively engaged with a corresponding one of the biasing members; and
      a plurality of springs secured on a second side of the limiting wheel to contact with the rotating plate, wherein the springs provide a resistance for actuating of the unidirectional rotation of the fishing reel;
   a driving roller received inside the roller recess and synchronously rotatable with the spool to engage with the brake blocks;
   a locking device mounted on the spool base to selectively limit the rotating of the limiting wheel; and
   an assembling means for keeping the spool base, the rotating plate, the spool, the driving roller, and the limiting wheel assembled together,
   wherein each guide trench is particularly defined to allow the brake block to freely rotate and move close to the biasing member when the driving roller rotates in one direction, but to limit the brake block from rotation and leave the biasing member to perform unidirectional rotating status of the spool; and
   the second guide trenches are kept empty.

2. The fishing reel as claimed in claim 1, wherein the spool base is composed of
   two arms protruding outwardly and laterally from one face of the spool base;
   a fixing member mounted on one arm and adapted to be firmly secured to the fishing rod; and
   an axle aperture is defined in the spool base.

3. The fishing reel as claimed in claim 1, where the spool is composed of
   a pole penetrated by an axle; and
   two ring plates perpendicularly surrounding and connected to the pole and having one combining bridge formed between the plates to form a U-shaped passage to receive a fishing line.

4. The fishing reel as claimed in claim 1, wherein the locking device comprises
   a cushion disposed between the spool base and the rotating plate to selectively lock the rotating plate and the limiting wheel;
   a lock collar having multiple stubs formed to correspond to the limit holes of the spool base; and
   a clutch knob threadingly engaged with the lock collar to control movement of the lock collar relative to the spool base.

5. The fishing reel as claimed in claim 1, wherein the assembling means is composed of an axle having a distal end penetrating the spool base, the rotating plate, the spool, the driving roller, and the limiting wheel respectively.

6. The fishing reel as claimed in claim 5 further comprising a trigger device composed of
   a resilient element mounted on the spool;
   a trigger sheet resiliently compressing the resilient element and having a through hole defined in a center thereof to receive and lock the insertion of the axle to keep all elements of the fishing reel in assembly;
   a tongue extending outwardly from the trigger sheet to control the movement of the trigger sheet; and
   a cap firmly screwed on the spool to enclose the trigger wheel between the pole and the cap and having a tongue hole defined in the cap so that the trigger sheet may be manipulated from outside of the spool.

* * * * *